United States Patent [19]

Ohara

[11] Patent Number: 4,789,782
[45] Date of Patent: Dec. 6, 1988

[54] RADIATION IMAGE RECORDING AND REPRODUCING SYSTEM

[75] Inventor: Yuji Ohara, Kanagawa, Japan

[73] Assignee: Fuji Photo Film Co., Ltd., Kanagawa, Japan

[21] Appl. No.: 85,494

[22] Filed: Aug. 14, 1987

[30] Foreign Application Priority Data

Aug. 15, 1986 [JP] Japan .................. 61-191267
Aug. 15, 1986 [JP] Japan .................. 61-191268
Aug. 15, 1986 [JP] Japan .................. 61-191269

[51] Int. Cl.$^4$ .......................................... G01N 23/04
[52] U.S. Cl. .................... 250/327.2; 250/484.1
[58] Field of Search .................. 250/327.2, 484.1

[56] References Cited

U.S. PATENT DOCUMENTS

| | | | |
|---|---|---|---|
| 4,258,264 | 3/1981 | Kotera et al. | 250/459.1 |
| 4,543,479 | 9/1985 | Kato | 250/327.2 |
| 4,578,582 | 3/1986 | Takano | 250/327.2 |
| 4,659,929 | 4/1987 | Fujiwara et al. | 250/327.2 |
| 4,704,530 | 11/1987 | Tamura et al. | 250/327.2 |

*Primary Examiner*—Janice A. Howell
*Assistant Examiner*—William F. Rauchholz
*Attorney, Agent, or Firm*—Sughrue, Mion, Zinn, Macpeak, and Seas

[57] ABSTRACT

A radiation image recording and reproducing system comprises recording apparatuses for recording image information on a stimulable phosphor sheet, read-out apparatuses for photoelectrically detecting the image information by scanning the stimulable phosphor sheet by stimulating rays, and a reproducing apparatus for scanning a recording sheet by light modulated with the image information thus read out to reproduce the image information on the recording sheet. The reproducing apparatus is provided with a plurality of trays, and the recording sheet with the image information reproduced thereon is distributed and fed into any one of the trays. The distribution of the recording sheet is carried out in accordance with the read-out apparatus which was used for reading out the image information reproduced on the recording sheet, the recording apparatus which was used for recording of the image information reproduced on the recording sheet, or predetermined classifying conditions with respect to the image information reproduced on the recording sheet.

15 Claims, 4 Drawing Sheets

RADIATION IMAGE RECORDING AND REPRODUCING SYSTEM

BACKGROUND OF THE INVENTION

1. Field of the Invention

This invention relates to a radiation image recording and reproducing system for exposing a stimulable phosphor sheet to a radiation carrying image information to have the image information stored thereon, exposing the stimulable phosphor sheet to stimulating rays which cause the stimulable phosphor sheet to emit light in proportion to the stored radiation energy, reading out the image information by photoelectrically detecting the emitted light, and reproducing the read-out image information as a visible image on a recording sheet.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to a stimulating ray beam such as a laser beam which causes the stimulable phosphor sheet to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording medium such as a photographic film, a display device such as a cathode ray tube (CRT), or the like.

The radiation image recording and reproducing system using a stimulable phosphor sheet is advantageous over conventional radiography using a silver halide photographic material in that the image can be recorded over a very wide range of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

In the aforesaid radiation image recording and reproducing system, the stimulable phosphor sheet is subjected to recording of image information in an image recording apparatus, and is then sent to a read-out apparatus in which the stimulable phosphor sheet carrying the image information stored thereon is scanned with stimulating rays for carrying out read-out of the image information. Then, a recording sheet is scanned with recording light modulated on the basis of the thus read-out image information, thereby to reproduce the image information on the recording sheet. The reproduced image information is then developed and used for making a diagnosis. The reproduction and the development of the image information on the recording sheet are carried out respectively at an image reproducing section and a development section. The image reproducing section and the development section are often built integrally with each other in a single image reproducing apparatus. Also, the image reproducing apparatus is often connected to a plurality of the image read-out apparatuses and used for reproducing the image information read out in these read-out apparatuses.

In the case where a single image reproducing apparatus is connected to a plurality of the read-out apparatuses as mentioned above, the number of the recording sheets conveyed out of the image reproducing apparatus after reproduction and development of the image information are finished becomes very large. Also, the reproduction and the development of the image information are carried out each time read-out of the image information is finished at each read-out apparatus, and therefore the condition of a plurality of the recording sheets taken out of the image reproducing apparatus after the reproduction and the development of the image information are finished becomes such that the recording sheets with various kinds of image information reproduced thereon are mixed with each other. Therefore, when a plurality of the recording sheets obtained in the manner as mentioned above are used for making a diagnosis, troublesome operations of classifying the recording sheets in accordance with the kind of the image information or the like must be carried out in advance.

SUMMARY OF THE INVENTION

The primary object of the present invention is to provide a radiation image recording and reproducing system wherein recording sheets are classified to some extent before the recording sheets are taken out of an image reproducing apparatus.

Another object of the present invention is to provide a radiation image recording and reproducing system which improves the efficiency of viewing operations, particularly the efficiency of diagnostic operations.

The present invention provides a radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises connecting said image reproducing apparatus to a plurality of said read-out apparatuses for carrying out the reproduction and the development of the image information read out in said read-out apparatuses, providing said image reproducing apparatus with a plurality of trays, distributing and feeding said recording sheet, on which the development has been finished, into either one of said trays, and carrying out said distribution of said recording sheet in accordance with the read-out apparatus which was used for reading out said image information reproduced and developed on said recording sheet.

The present invention also provides a radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises constituting said image reproducing apparatus to carry out the reproduction and the development of the image information, which is recorded in a plurality of said image recording apparatuses, via said read-out apparatus, providing said image reproducing apparatus with a plurality of trays, distributing and feeding said recording sheet, on which the development has been finished, into either one of said trays, and carrying out said distribution of said recording sheet in accordance with the image recording apparatus which was used for recording said image information reproduced and developed on said recording sheet.

The present invention further provides a radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises providing said image reproducing apparatus with a plurality of trays, distributing and feeding said recording sheet, on which the development has been finished, into either one of said trays, and carrying out said distribution of said recording sheet in accordance with predetermined classifying conditions with respect to said image information reproduced and developed on said recording sheet.

The image reproducing apparatus in the radiation image recording and reproducing system in accordance with the present invention is provided with an image reproducing section for carrying out the reproduction of the image information on the recording sheet, and a development section for developing the image information reproduced on the recording sheet. The image reproducing section and the development section may be built integrally with each other as a single unit in the image reproducing apparatus. Or, in the case where the image reproducing apparatus is constituted so that the recording sheet conveyed out of the image reproducing section is fed directly into the development section, the image reproducing section and the development section may be connected with each other via a sheet conveyance means or the like.

Also, in the radiation image recording and reproducing system in accordance with the second-mentioned present invention, read-out of the image information from the stimulable phosphor sheets carrying the image information stored thereon in a plurality of the image recording apparatuses may be carried out by a single read-out apparatus. Or, the stimulable phosphor sheets carrying the image information stored thereon may be distributed among a plurality of the read-out apparatuses for reading out the image information from the stimulable phosphor sheets, and the plurality of the read-out apparatuses may be connected to the single image reproducing apparatus.

Further, in the radiation image recording and reproducing system in accordance with the finally-mentioned present invention, the number of the read-out apparatuses and the number of the image recording apparatuses connected to the image reproducing apparatus may be adjusted arbitrarily. Thus a single read-out apparatus and a single image recording apparatus may be connected to the image reproducing apparatus, or a plurality of the read-out apparatuses and a plurality of the image recording apparatuses may be connected to the image reproducing apparatus. Also, the predetermined classifying conditions embrace a person (a physician or the like) who requests the image recording, an operator (a technician or the like) for operating the image recording apparatus, an object (a patient or the like), and the like.

With the radiation image recording and reproducing system in accordance with the present invention, the image reproducing apparatus is provided with a plurality of the trays, and the recording sheets are distributed and fed into the trays in accordance with the read-out apparatus which was used for reading out the image information reproduced and developed on the individual recording sheets, in accordance with the image recording apparatus which was used for recording the image information reproduced and developed on the individual recording sheets, or in accordance with the predetermined classifying conditions with respect to the image information reproduced and developed on the individual recording sheets. The recording sheets are taken out of the image reproducing apparatus in the form housed in the individual trays, and thus the recording sheets classified in accordance with the read-out apparatus which was used for reading out the image information reproduced and developed on the recording sheets, in accordance with the image recording apparatus which was used for recording the image information reproduced and developed on the recording sheets, or in accordance with the predetermined classifying conditions with respect to the image information reproduced and developed on the recording sheet, can be obtained automatically. Therefore, it becomes unnecessary to classify the recording sheets taken out of the image reproducing apparatus in accordance with the read-out apparatus, in accordance with the image recording apparatus, or in accordance with the predetermined classifying conditions before a diagnosis is to be made. Also, in the case where the recording sheets are to be further classified into subclasses, such classification is facilitated. Thus it is possible to prevent the operation of classifying the recording sheets after completion of the reproduction and the development from becoming complicated even though a plurality of the read-out apparatuses are connected to the single image reproducing apparatus, or the reproduction and the development of the image information recorded by use of a plurality of the image recording apparatuses are carried out by use of the single image reproducing apparatus, and the number and kinds of the reproduced visible images increase.

DESCRIPTION OF THE PREFERRED EMBODIMENTS

The present invention will hereinbelow be described in further detail with reference to the accompanying drawings.

Figure 1:
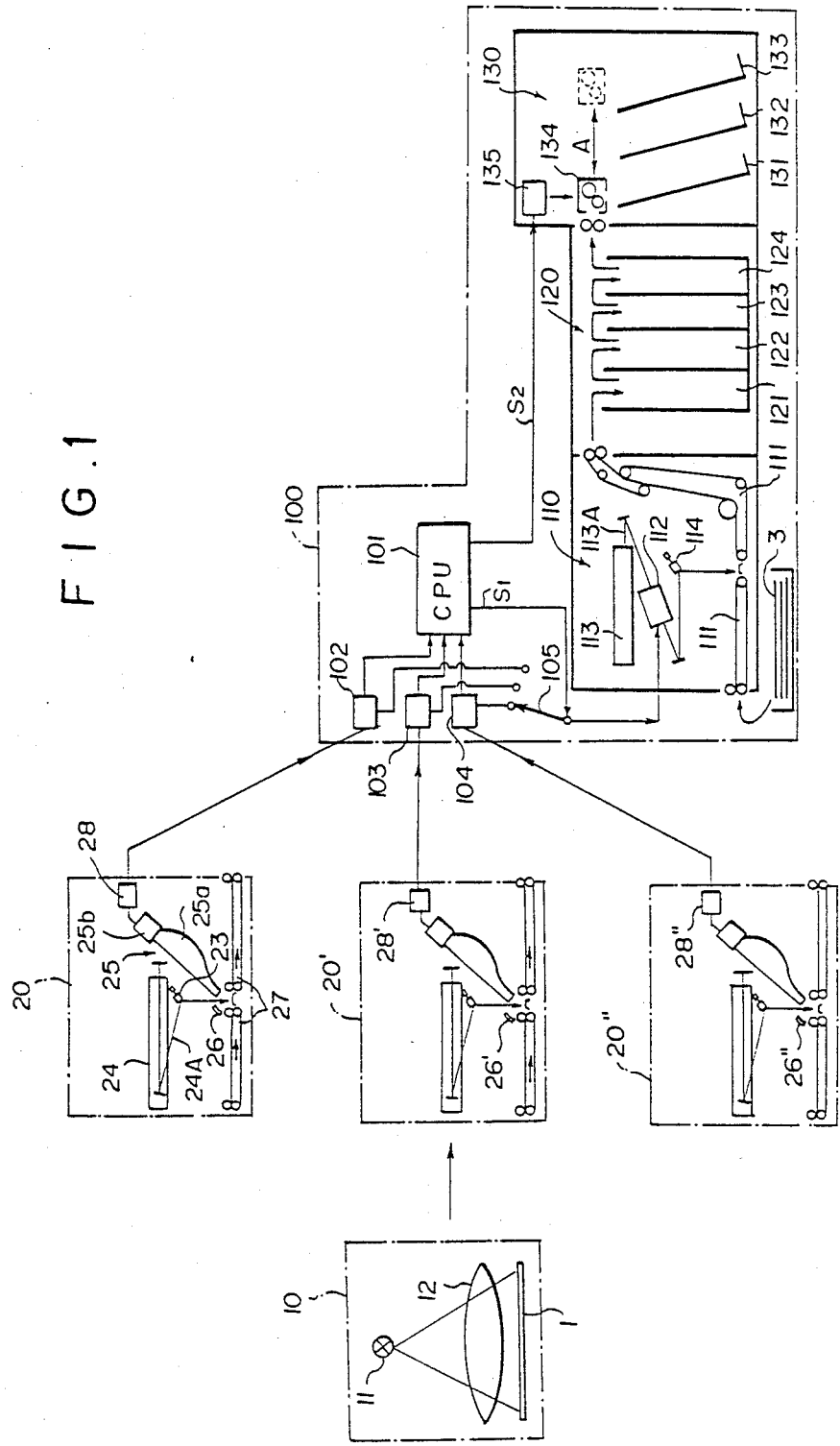
FIG. 1 is a schematic view showing an embodiment of the radiation image recording and reproducing system in accordance with the present invention.

FIG. 1 schematically shows the configuration of an embodiment of the radiation image recording and reproducing system in accordance with the present invention.

In FIG. 1, image recording on a stimulable phosphor sheet 1 is first carried out in an image recording apparatus 10. The stimulable phosphor sheet 1 is disposed to stand facing a radiation source 11 constituted by an X-ray source or the like with an object 12 intervening therebetween in the image recording apparatus 10. In this condition, the radiation source 11 is activated to emit a radiation, and the stimulable phosphor sheet 1 is exposed to the radiation passing through the object 12 to have radiation image information of the object 12 stored on the stimulable phosphor sheet 1. In the course of the image recording, the stimulable phosphor sheet 1 may be housed in a radiation-permeable, lighttight cassette for housing a single sheet 1. Or, for example, in the case where the image recording is to be carried out continuously, a plurality of the stimulable phosphor sheets 1, 1, . . . may be housed in a sheet feed magazine, taken out one after another from the sheet feed magazine, and subjected to the image recording. After the image recording on the stimulable phosphor sheet 1 is finished, the stimulable phosphor sheet 1 is taken out of the image recording apparatus 10 and fed into a read-out apparatus for reading out the image information stored on the stimulable phosphor sheet 1. In the case where the stimulable phosphor sheet 1 was subjected to the image recording in the form housed in the cassette, the sheet 1 is fed in this form into the read-out apparatus. In the case where the stimulable phosphor sheets 1, 1, . . . were subjected to the image recording by being taken out one after another from the sheet feed magazine, they are sequentially fed into a sheet housing magazine after the image recording is finished, and are fed into the read-out apparatus in the form housed in the sheet housing magazine.

In this embodiment, by way of example, read-out of the image information is carried out by use of a first readout apparatus 20, a second read-out apparatus 20' and a third read-out apparatus 20". The read-out apparatuses 20, 20' and 20" have the same configurations, which will be described below by taking the first read-out apparatus 20 as an example. This embodiment may be modified so that a plurality of the image recording apparatuses 10, 10, . . . are provided, and the read-out apparatuses 20, 20' and 20" are used for carrying out read-out from the stimulable phosphor sheets 1, 1, . . . carrying the image information stored thereon in the respective image recording apparatuses 10, 10, . . .

At the read-out apparatus 20, the stimulable phosphor sheet 1 carrying the radiation image information stored thereon is scanned with stimulating rays 24A such as a laser beam which cause the stimulable phosphor sheet 1 to emit light in proportion to the stored radiation energy, and the emitted light is photoelectrically detected by a photoelectric read-out means 25 provided with a photodetector such as a photomultiplier to obtain electric image signals for use in reproduction of a visible image. Reference numeral 24 denotes a stimulating ray source, and reference numeral 23 denotes a light deflector such as a galvanometer mirror. Reference numeral 26 designates a reflection mirror for reflecting the light emitted by the stimulable phosphor sheet 1 towards a light guide member 25a of the photoelectric read-out means 25. The light guide member 25a guides the light through total reflection therein up to a photodetector 25b constituted by a photomultiplier or the like. The stimulable phosphor sheet 1 sent to the read-out apparatus 20 is taken out of the cassette or the sheet housing magazine, conveyed by the sheet conveyance means 27 in the direction as indicated by the arrow, and the whole surface of the stimulable phosphor sheet 1 is scanned two-dimensionally by the stimulating rays 24A deflected approximately normal to the conveyance direction. The light emitted by the stimulable phosphor sheet 1 during the scanning is detected by the photodetector 25b via the light guide member 25a. The detected light is converted by the photodetector 25b into electric signal, and the image signals thus obtained are sent to an image information processing circuit 28 for processing the electric signals, and the processed electric signals are sent to an image reproducing apparatus 100 as will be described later. After the read-out of the image information from the stimulable phosphor sheet 1 is finished, the stimulable phosphor sheet 1 is conveyed out of the read-out apparatus 20, sent to an erasing apparatus (not shown) for exposing the stimulable phosphor sheet 1 to erasing light for releasing the radiation energy remaining on the stimulable phosphor sheet 1 and making the sheet 1 reusable for image recording.

The read-out apparatuses 20, 20' and 20" are connected to the image reproducing apparatus 100, and the image information read out at each of the read-out apparatuses 20, 20' and 20" is reproduced on a recording sheet 3 constituted by a photographic film or the like at the image reproducing apparatus 100. The image reproducing apparatus 100 is provided with a central processing unit (CPU) 101, and the image information read out at the first read-out apparatus 20, the image information read out at the second read-out apparatus 20' and the image information read out at the third read-out apparatus 20" are sequentially reproduced under the control of the CPU 101. The image reproducing apparatus 100 is also provided with an image reproducing section 110 for reproducing the image information on each of the recording sheets 3, 3, ... conveyed one after another by a sheet conveyance means 111 by scanning the recording sheet 3 with recording light 113A modulated by a modulator 112 and then deflected by a light deflector 114, a development section 120 for developing the recording sheet 3 conveyed out of the image reproducing section 110, and a tray housing section 130 for releasably holding trays 131, 132 and 133 capable of housing a plurality of the recording sheets 3, 3, ... therein.

The electric signals (i.e. image signals) representing the image information and output by the image information processing circuit 28 of the first read-out apparatus 20 are stored in a first frame memory 102 of the image reproducing apparatus 100, the image signals output by an image information processing circuit 28' of the second read-out apparatus 20' are stored in a second frame memory 103, and the image signals output by an image information processing circuit 28" of the third read-out apparatus 20" are stored in a third frame memory 104. When the image signals are stored in any one of the frame memories 102, 103 and 104, the frame memory sends a signal to the CPU 101 as indicated by the full line in FIG. 1. The frame memories 102, 103 and 104 are selectively connected to the modulator 112 of the image reproducing section 110 by a switch 105 for operating the modulator 112 on the basis of the stored image signals. Upon receiving the signal representing that the image signals have been stored in any one of the frame memories 102, 103 and 104, the CPU 101 sends a control signal S1 to the switch 105 for controlling the switch 105 so that it connects the frame memory storing the image signals to the modulator 112. When the frame memories 102, 103 and 104 are selectively connected to the modulator 112 under the control of the CPU 101, the image information read out at the first read-out apparatus 20, the image information read out at the second read-out apparatus 20' and the image information read out at the third read-out apparatus 20" can be sequentially reproduced at the image reproducing section 110. In the case where a light source 113 for emitting the recording light 113A is a semiconductor laser capable of carrying out direct analog modulation, the modulator 112 may be omitted and the frame memories 102, 103 and 104 may be selectively connected to a drive circuit for the semiconductor.

After reproduction of the image information on the recording sheet 3 is finished at the image reproducing section 110, the recording sheet 3 is sent to the development section 120 for carrying out a development processing of the recording sheet 3. The development section 120 is composed of a development zone 121, a fixing zone 122, a washing zone 123 and a drying zone 124. The recording sheet 3 is sent to the respective zones 121, 122, 123 and 124 sequentially, developed thereby, and conveyed out of the development section 120.

The tray housing section 130 is disposed adjacent to the development section 120, and the recording sheet 3 conveyed out of the development section 120 is distributed and fed into any one of the trays 131, 132 and 133 in the tray housing section 130. Specifically, the first tray 131 is used for housing the recording sheet 3 on which the image information read out at the first read-out apparatus 20 has been reproduced and developed, the second tray 132 is used for housing the recording sheet 3 on which the image information read out at the second read-out apparatus 20' has been reproduced and developed, and the third tray 133 is used for housing the recording sheet 3 on which the image information read out at the first read-out apparatus 20" has been reproduced and developed. In order to feed the predetermined recording sheet 3 selectively into any one of the trays 131, 132 and 133, feed-in rollers 134 moveable in the direction as indicated by the arrow A are disposed above the trays 131, 132 and 133. The feed-in rollers 134 are first disposed at the position as indicated by the full line in FIG. 1, and receive the recording sheet 3 conveyed out of the development section 120. Then, the feed-in rollers 134 are moved in the direction as indicated by the arrow A up to the position above the predetermined tray, and feed the recording sheet 3 into the predetermined tray. The movement of the feed-in rollers 134 is controlled by a pulse motor 135 operated on the basis of an instruction received from the CPU 101.

Specifically, when the signal representing that the image signals have been stored in any one of the frame memories 102, 103 and 104 is fed from any one of the frame memories 102, 103 and 104 to the CPU 101, the CPU 101 sends the control signal S1 to the switch 105 for changing over the switch 105 as mentioned above, and feeds to the pulse motor 135 a control signal S2 representing the read-out apparatus used for reading out the image information which is to be reproduced on the recording sheet 3 fed into the tray housing section 130. The pulse motor 135 moves the feed-in rollers 134 to the position above the predetermined tray in accordance with the control signal S2. Therefore, the recording sheets 3, 3, ... are classified and fed into the trays 131, 132 and 133 in accordance with the read-out apparatuses 20, 20' and 20" which were used for reading out the image information reproduced on the individual recording sheets 3, 3, ... Accordingly, when the trays 131, 132 and 133 are taken out of the tray housing section 130, the recording sheets 3, 3, ... classified in accordance with the read-out apparatuses 20, 20' and 20" which were used for reading out the image information reproduced on the individual recording sheets 3, 3, ... can be obtained automatically, and it becomes unnecessary to manually classify the recording sheets 3, 3, ... before the recording sheets 3, 3, ... are to be used for viewing, particularly for diagnostic purposes.

The number, the inclination and other features of the trays 131, 132 and 133 housed in the tray housing section 130 are not limited to those in the aforesaid embodiment. The read-out apparatuses and the trays need not necessarily be made to correspond in a one-to-one relation to each other, and a plurality of the trays may be made to correspond to a single read-out apparatus, or a plurality of the read-out apparatuses may be made to correspond to a single tray.

Figure 2:
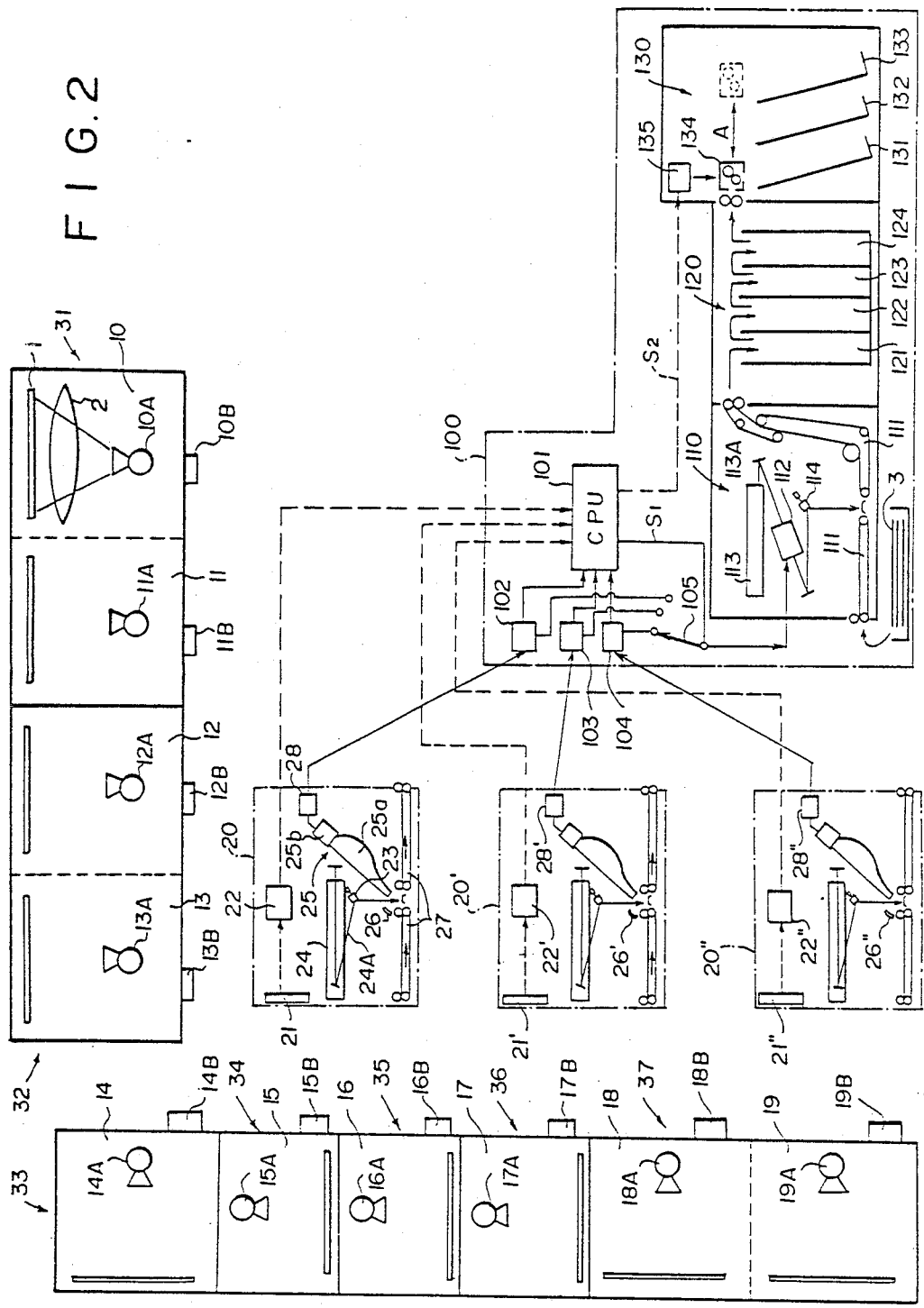
FIG. 2 is a schematic view showing another embodiment of the radiation image recording and reproducing system in accordance with the present invention.

Another embodiment of the radiation image recording and reproducing system in accordance with the present invention will hereinbelow be described with reference to FIG. 2. In FIG. 2, similar elements are numbered with the same reference numerals with respect to FIG. 1, except for the reference numerals 11 and 12 in FIG. 1.

In the embodiment shown in FIG. 2, by way of example, ten image recording apparatuses from a first image recording apparatus 10 to a tenth image recording apparatus 19 are provided. The image recording apparatuses 10 to 19 are respectively provided with radiation sources 10A to 19A constituted by an X-ray source or the like, and controllers 10B to 19B. Also, a first image recording compartment 31 is constituted by the first image recording apparatus 10 and the second image recording apparatus 11, and a second image recording compartment 32 is constituted by the third image recording apparatus 12 and the fourth image recording apparatus 13. A third image recording compartment 33 is constituted by the fifth image recording apparatus 14, and a fourth image recording compartment 34 is constituted by the sixth image recording apparatus 15. A fifth image recording compartment 35 is constituted by the seventh image recording apparatus 16, a sixth image recording compartment 36 is constituted by the eighth image recording apparatus 17, and a seventh image recording compartment 37 is constituted by the ninth image recording apparatus 18 and the tenth image recording apparatus 19. In each of the image recording apparatuses 10 to 19, radiation image information of an object 2 is stored on the stimulable phosphor sheet 1 in the same manner as described with reference to FIG. 1.

Read-out of the image information from the stimulable phosphor sheets 1, 1, . . . on which image recording was carried out at the image recording apparatuses 10 to 19 may be carried out at any of the read-out apparatuses 20, 20' and 20". The read-out apparatuses 20, 20' and 20" are respectively provided with panels 21, 21' and 21". When the stimulable phosphor sheet 1 on which the image recording is finished is fed to the read-out apprratus 20, 20' or 20", the number of the image recording apparatus used for carrying out the image recording on the stimulable phosphor sheet 1 (for example, No. 1 for the first image recording apparatus 10) is input from the panel 21, 21' or 21". The numbers of the image recording apparatuses input from the panels 21, 21' and 21" are stored in memories 22, 22' and 22" disposed respectively in the read-out apparatuses 20, 20' and 20".

The read-out apparatuses 20, 20' and 20" are connected to the image reproducing apparatus 100, and the image information read out at each of the read-out apparatuses 20, 20' and 20" is reproduced on a recording sheet 3 constituted by a photographic film or the like at the image reproducing apparatus 100. Therefore, all of the image information stored on the stimulable phosphor sheets 1, 1, . . . at the image recording apparatuses 10 to 19 is reproduced at the image reproducing apparatus 100.

In this embodiment, distribution of the recording sheet 3 conveyed out of the development section 120 into any one of the trays 131, 132 and 133 at the tray housing section 130 is carried out in accordance with the image recording apparatus which was used for recording the image information reproduced and developed on the recording sheet 3. For example, the first tray 131 is used for housing the recording sheets 3, 3, . . . on which the image information recorded at the first image recording apparatus 10 to the fourth image recording apparatus 13 has been reproduced and developed, the second tray 132 is used for housing the recording sheets 3, 3, . . . on which the image information recorded at the fifth image recording apparatus 14 to the seventh image recording apparatus 16 has been reproduced and developed, and the third tray 133 is used for housing the recording sheets 3, 3, . . . on which the image information recorded at the eighth image recording apparatus 17 to the tenth image recording apparatus 19 has been reproduced and developed.

The movement of the feed-in rollers 134 is controlled by the pulse motor 135 operated on the basis of an instruction received from the CPU 101. Specifically, when sending of the image signals from, for example, the image information processing circuit 28 of the first read-out apparatus 20 to the frame memory 102 is started, the memory 22 in the first read-out apparatus 20 feeds a signal representing the number of the image recording apparatus which has been stored in the memory 22 to the CPU 101. Upon receiving the signal representing the number of the image recording apparatus, the CPU 101 outputs the control signal S2 to the pulse motor 135 in accordance with the predetermined combination of the image recording apparatuses with the tray. The pulse motor 135 moves the feed-in rollers 134 to the position above the predetermined tray in accordance with the control signal S2. Therefore, the recording sheet 3 is classified and fed by the feed-in rollers 134 into any one of the trays 131, 132 and 133 in accordance with the image recording apparatus used for recording the image information reproduced and developed on the recording sheet 3. The combinations of the image recording apparatuses with the trays may be determined arbitrarily. Also, in the case where the respective image recording apparatuses are built in the image recording compartments as in this embodiment, the image recording compartments may be made to correspond to the respective trays such that the first image recording compartment 31 to the third image recording compartment 33 correspond to the first tray 131, the fourth image recording compartment 34 and the fifth image recording compartment 35 correspond to the second tray 132, and the sixth image recording compartment 37 and the seventh image recording compartment 38 correspond to the third tray 133. The number of the trays with respect to the image recording apparatuses is not limited to three, and the trays may be provided in a number equal to the number of the image recording apparatuses and made to correspond in a one-to-one relation to the image recording apparatuses. Or, the trays may be provided in a number larger than the number of the image recording apparatuses so that a plurality of the trays correspond to a single image recording apparatus. Also, only a single read-out apparatus may be provided, and a plurality of the image recording apparatuses may be connected to the single read-out apparatus. In any case, when the trays are taken out of the tray housing section 130, the recording sheets 3, 3, . . . classified in accordance with the image recording apparatuses used for recording the image information reproduced and developed on the individual recording sheets 3, 3, . . . can be obtained automatically. Therefore, even though a plurality of the image recording apparatuses are connected to a single image reproducing apparatus, it becomes unnecessary to manually classify the recording sheets 3, 3, . . . in accordance with the image recording apparatuses before the recording sheets 3, 3, . . . are to be used for viewing, particularly for diagnostic purposes.

Figure 3:
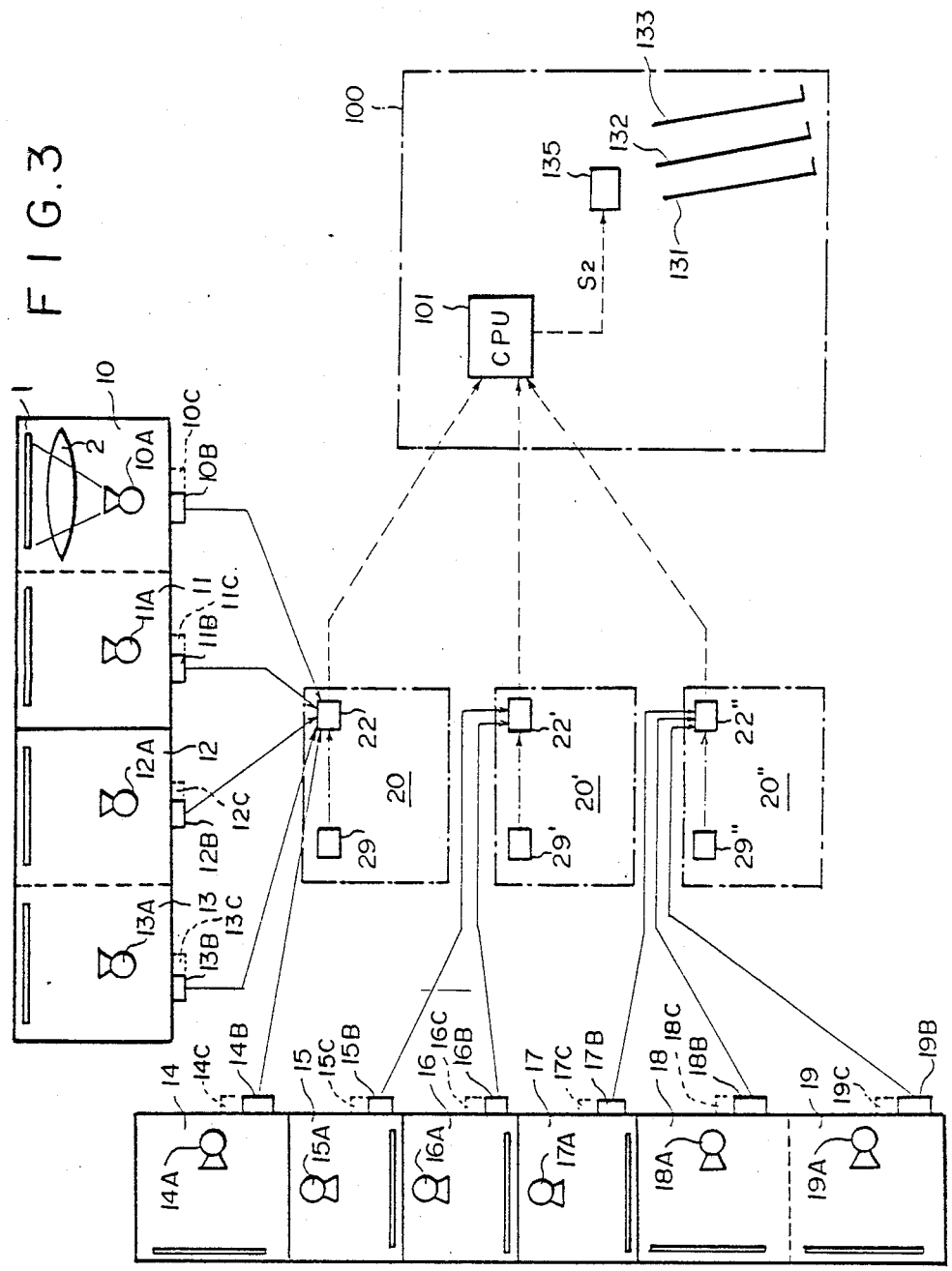
FIGS. 3 and 4 are schematic views showing further embodiments of the radiation image recording and reproducing system in accordance with the present invention.

A further embodiment of the radiation image recording and reproducing system in accordance with the present invention will hereinbelow be described with reference to FIG. 3. In FIG. 3, similar elements are numbered with the same reference numerals with respect to FIG. 2. In this embodiment, input of the number of the image recording apparatus is carried out at the time of recording of the image information, instead of at the time of read-out of the image information.

The stimulable phosphor sheet is usually provided with a bar code on the back surface. In this embodiment, the controllers 10B to 19B of the image recording apparatuses 10 to 19 are provided with the function of reading out the bar code. Also, the first image recording apparatus 10 to the fifth image recording apparatus 14 are connected to the first read-out apparatus 20, the sixth image recording apparatus 15 and the seventh image recording apparatus 16 are connected to the second read-out apparatus 20', and the eighth image recording apparatus 17 to the tenth image recording apparatus 19 are connected to the third read-out apparatus 20''. Each of the read-out apparatuses 20, 20' and 20'' is constituted to carry out read-out of the image information only for the stimulable phosphor sheets 1, 1, . . . on which image recording was carried out at the image recording apparatuses connected to the read-out apparatus.

Before image recording on the stimulable phosphor sheets 1, 1, . . . is carried out at the image recording apparatuses 10 to 19, the bar codes of the stimulable phosphor sheets 1, 1, . . . are read out by the controllers 10B to 19B, and the bar codes thus read out are sent to the memories 22, 22' and 22'' of the read-out apparatuses 20, 20' and 20'' to which the respective image recording apparatuses are connected. The controllers 10B to 19B also output the numbers of the corresponding image recording apparatuses together with the bar codes of the stimulable phosphor sheets 1, 1, . . . on which image recording is carried out. Each of the bar codes and the number of each image recording apparatus are stored in combination with each other in each of the memories 22, 22' and 22''.

After the image recording on the stimulable phosphor sheet 1 is finished at each of the image recording apparatuses 10 to 19, the stimulable phosphor sheet 1 is fed to the read-out apparatus 20, 20' or 20'' connected to the image recording apparatus which carried out the image recording, and the image information stored on the stimulable phosphor sheet 1 is read out. The read-out apparatuses 20, 20' and 20'' are provided with bar code read-out means 29, 29' and 29''. When the stimulable phosphor sheet 1 is fed to the read-out apparatus, the bar code of the stimulable phosphor sheet 1 is read out, and the signal representing the bar code is sent to the memory (22, 22' or 22'') in the read-out apparatus. On the basis of the bar code, the number of the image recording apparatus used for carrying out the image recording on the stimulable phosphor sheet 1 on which image information read-out is to be carried out is taken out from the memory (22, 22' or 22''). The signal representing the number of the image recording apparatus is sent to the CPU 101 in the image reproducing apparatus 100. The relationships between the trays 131, 132 and 133 and the image recording apparatuses 10 to 19 are registered in advance in the CPU 101. The CPU 101 sends the signal S2 in accordance with the entered number of the image recording apparatus to the pulse motor 135, thereby to distribute and feed the recording sheet with the image information reproduced and developed thereon into the predetermined tray in accordance with the image recording apparatus.

Instead of providing the controllers 10B to 19B with the function of reading out the bar code of the stimulable phosphor sheet and sending the read-out bar code together with the number of the image recording apparatus to the memories 22, 22' and 22'', terminal sections 10C to 19C as indicated by the broken lines in FIG. 3 may be disposed at the image recording apparatuses 10 to 19 independently of the controllers 10B to 19B. Read-out of the bar code may be carried out by the terminal sections 10C to 19C. Also, the numbers of the image recording apparatuses may be entered to the terminal sections 10C to 19C, and the bar codes and the number of the image recording apparatuses may be sent from the terminal sections 10C to 19C to the memories 22, 22' and 22'' of the read-out apparatuses 20, 20' and 20''. Also, in this embodiment wherein the signal representing the bar code and the signal representing the number of the image recording apparatus are directly entered from the respective image recording apparatuses to the read-out apparatuses and the number of the image recording apparatus is taken out by comparison with the bar code which is read out at the read-out apparatus, the read-out apparatus for carrying out read-out of the image information is determined for each image recording apparatus. However, in the case where the stored information can be held in common among the memories 22, 22' and 22'' of the read-out apparatuses 20, 20' and 20'', read-out of the image information from the stimulable phosphor sheet 1 carrying the image information stored thereon at each image recording apparatus can be carried out at every read-out apparatus. In this case, even if a failure arises with the mechanism of the stimulating ray scanning system in one of the read-out apparatuses 20, 20' and 20'' or with the mechanism of the sheet conveyance system, or the like, read-out of the image information from the stimulable phosphor sheet can be carried out by use of the other read-out apparatuses insofar as the memories of the read-out apparatuses are operable.

Figure 4:
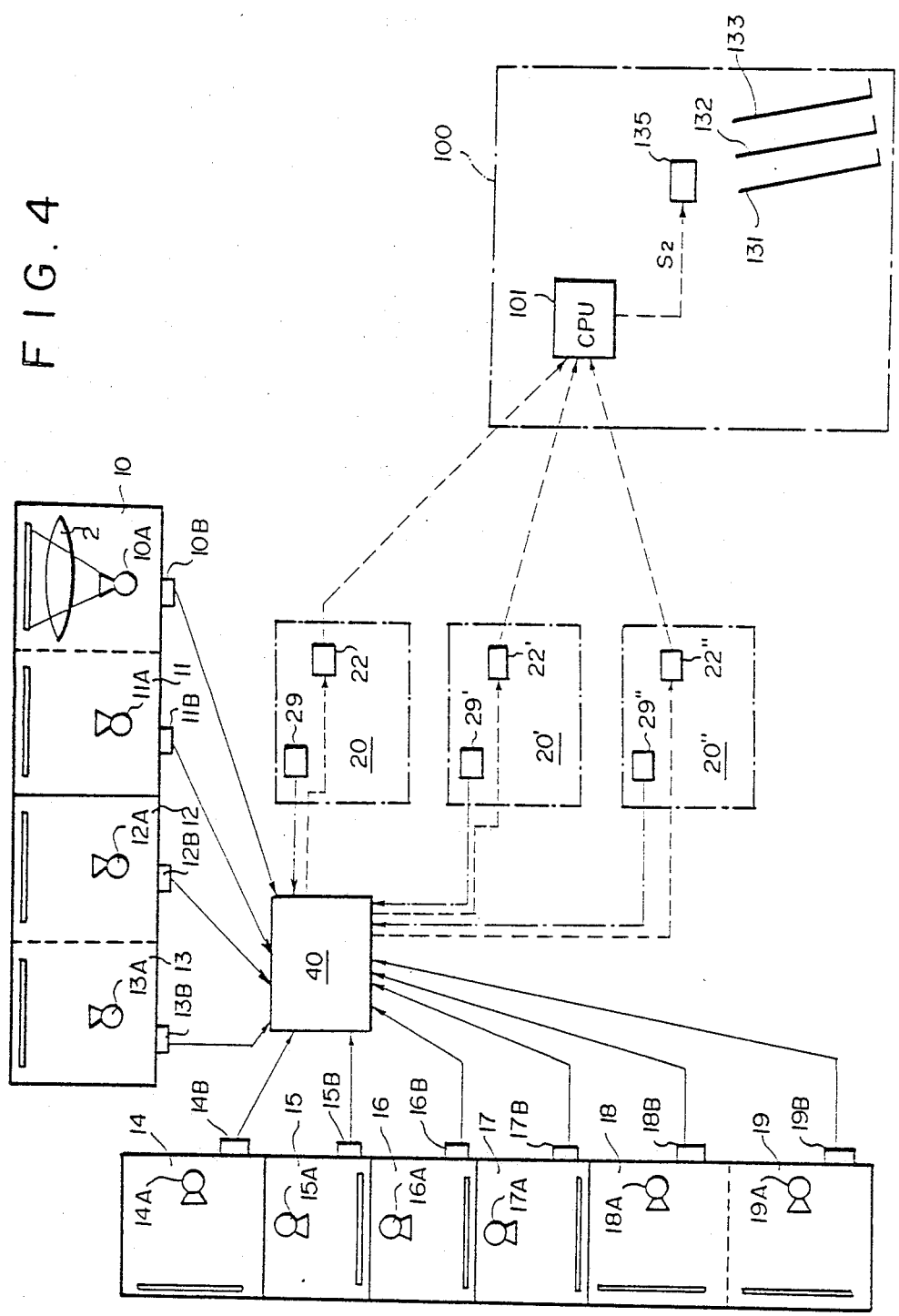

A still further embodiment of the radiation image recording and reproducing system in accordance with the present invention will hereinbelow be described with reference to FIG. 4. In FIG. 4, similar elements are numbered with the same reference numerals with respect to FIG. 2. In this embodiment, the signals representing the bar codes and the signals representing the numbers of the image recording apparatuses, which are output from the controllers 10B to 19B of the image recording apparatuses 10 to 19, are sent to a data controller 40 and stored therein. The stimulable phosphor sheet 1 on which the image recording is finished is sent to any one of the read-out apparatuses 20, 20' and 20'' for carrying out read-out from the stimulable phosphor sheet 1. In the course of the read-out, the bar code of the stimulable phosphor sheet 1 is read out by the bar code read-out means (29, 29' or 29'') in the read-out apparatus. In this embodiment, the stimulable phosphor sheet 1 carrying the image information stored thereon at each image recording apparatus may be sent to any of the read-out apparatuses 20, 20' and 20''. The bar code read-out means 29, 29' and 29'' sends the signal representing the read-out bar code to the data controller 40. The number of the image recording apparatus corresponding to the bar code is taken out from the data controller 40 and sent to the memory (22, 22' or 22'') in the read-out apparatus which is now carrying out the read-out from the stimulable phosphor sheet 1. The signal representing the one of the memories 22, 22' and 22'', is sent to the CPU 101 at the time the read-out apparatus begins sending the image information to the image reproducing apparatus 100. On the basis of the relationships between the image recording apparatuses 10 to 19 and the trays 131, 132 and 133, which are registered in advance, the CPU 101 generates the signal S2 for distributing and feeding the recording sheet into any one of the trays 131, 132 and 133 in accordance with the number of the image recording apparatus. With this embodiment wherein the data controller 40 is provided and the bar code of each stimulable phosphor sheet and the number of each image recording apparatus are stored in the data controller 40, the stimulable phosphor sheet on which the image recording is finished can be subjected to the image read-out at any of the read-out apparatuses 20, 20' and 20" regardless of the number of the image recording apparatus.

Another embodiment of the radiation image recording and reproducing system in accordance with the present invention, wherein distribution of the recording sheet is carried out in accordance with predetermined classifying conditions with respect to the image information reproduced and developed on the recording sheet, will hereinbelow be described with reference to FIG. 2.

In this embodiment, image recording is carried out on many objects by many operators in accordance with requests made by many persons at the image recording apparatuses 10 to 19. When the stimulable phosphor sheet on which image recording is finished is fed to each of the read-out apparatuses 20, 20' and 20", predetermined conditions with respect to the image information stored on the stimulable phosphor sheet, i.e. such conditions as the person who requests the image recording, the operator for operating the image recording apparatus, and the object (the information on these conditions is hereinafter generically referred to as the classifying information), are entered from each of the panels 21, 21' and 21". As the classifying information, the names of the person who requests the image recording or the like may be entered directly, or the names of the person may be stored in conformity with a symbol, a number or the like and may be entered as the symbol, the number or the like. The classifying information entered from the panels 21, 21' and 21" is stored in the memories 22, 22' and 22" disposed in the read-out apparatuses 20, 20' and 20".

At the tray housing section 130, distribution of the recording sheet 3 among the trays 131, 132 and 133 is carried out in accordance with the aforesaid classifying information with respect to the image information reproduced and developed on the recording sheet 3. For example, in the case where the classifying information is the person (physician) who requests the image recording, classification is effected such that the recording sheets 3, 3, ... corresponding to the image recording requested by a physician A and a physician B are fed into the first tray 131, the recording sheets 3, 3, ... corresponding to the image recording requested by a physician C and a physician D are fed into the second tray 132, and the recording sheets 3, 3, ... corresponding to the image recording requested by a physician E, a physician F and a physician G are fed into the third tray 133.

The movement of the feed-in rollers 134 is controlled by the pulse motor 135 operated on the basis of an instruction received from the CPU 101. Specifically, when sending of the image signals from, for example, the image information processing circuit 28 of the first read-out apparatus 20 to the frame memory 102 is started, the memory 22 in the first read-out apparatus 20 feeds a signal representing the person (physician) who requested the image recording, which has been stored in the memory 22, to the CPU 101. Upon receiving the signal representing the person who requested the image recording, the CPU 101 outputs the control signal S2 to the pulse motor 135 in accordance with the predetermined combination of the persons who requested the image recording with the tray. The pulse motor 135 moves the feed-in rollers 134 to the position above the predetermined tray in accordance with the control signal S2. Therefore, the recording sheet 3 is classified and fed by the feed-in rollers 134 into any one of the trays 131, 132 and 133 in accordance with the person who requested the recording of the image information reproduced and developed on the recording sheet 3. The combinations of the persons who requested the image recording with the trays may be determined arbitrarily. Also, the number of the trays is not limited to three, and the trays may be provided in a number equal to the number of the persons who request the image recording and made to correspond a in one-to-one relation to the persons who request the image recording. Or, the trays may be provided in a number larger than the number of the persons who request the image recording so that a plurality of the trays corresponds to a single person who requests the image recording. Besides the person who requests the image recording, the classifying conditions for the recording shet 3 may be the operator such as a technician who carries out the image recording, the object such as a patient, or the like. Also, only a single image recording apparatus and/or only a single read-out apparatus may be provided with respect to the single image reproducing apparatus. The memories 22, 22' and 22" of the read-out apparatuses 20, 20' and 20" may be constituted to feed the entered classifying information directly to the CPU 101, and the classifying information and the trays may be made to correspond to each other in the CPU 101. Alternatively, the combinations of the classifying information with the trays may be stored in advance in the memories 22, 22' and 22", and the signal representing the number of the tray may be sent from the memories 22, 22' and 22" to the CPU 101 on the basis of the classifying information entered to the memories 22, 22' and 22". In any case, when the trays are taken out of the tray housing section 130, the recording sheets 3, 3, ... classified in accordance with the predetermined conditions can be obtained automatically. Therefore, it becomes unnecessary to manually classify the recording sheets 3, 3, ... in accordance with the desired classifying conditions before the recording sheets 3, 3, ... are to be used for viewing, particularly for diagnostic purposes.

A further embodiment of the radiation image recording and reproducing system in accordance with the present invention, wherein distribution of the recording sheet is carried out in accordance with predetermined classifying conditions with respect to the image information reproduced and developed on the recording sheet, will hereinbelow be described with reference to FIG. 3. In this embodiment, input of the classifying information is carried out at the time of recording of the image information, instead of at the time of read-out of the image information.

The stimulable phosphor sheet is usually provided with a bar code on the back surface. In this embodiment, the controllers 10B to 19B of the image recording apparatuses 10 to 19 are provided with the function of reading out the bar code. Connections of the image recording apparatuses 10 to 19 with the read-out apparatuses 20, 20' and 20'' are effected in the manner as mentioned above with reference to FIG. 3, and each of the read-out apparatuses 20, 20' and 20'' is constituted to carry out read-out of the image information only for the stimulable phosphor sheets 1, 1, . . . on which image recording was carried out at the image recording apparatuses connected to the read-out apparatus.

Before image recording on the stimulable phosphor sheets 1, 1, . . . is carried out at the image recording apparatuses 10 to 19, the bar codes of the stimulable phosphor sheets 1, 1, . . . are read out by the controllers 10B to 19B, and the bar codes thus read out are sent to the memories 22, 22' and 22'' of the read-out apparatuses 20, 20' and 20'' to which the respective image recording apparatuses are connected. The controllers 10B to 19B are provided with an input means for entering the predetermined classifying information, and the predetermined classifying information such as the names of the physician, the names of the technician, or the names of the patient is entered to the controllers 10B to 19B at the time the image recording is to be carried out. The entered classifying information is also sent to the memories 22, 22' and 22'', and each of the bar codes and the classifying information are stored in combination with each other in each of the memories 22, 22' and 22''.

After the image recording on the stimulable phosphor sheet 1 is finished at each of the image recording apparatuses 10 to 19, the stimulable phosphor sheet 1 is fed to the read-out apparatus 20, 20' or 20'' connected to the image recording apparatus which carried out the image recording, and the image information stored on the stimulable phosphor sheet 1 is read out. The rea-out apparatuses 20, 20' and 20'' are provided with bar code read-out means 29, 29' and 29''. When the stimulable phosphor sheet 1 is fed to the read-out apparatus, the bar code of the stimulable phosphor sheet 1 is read out, and the signal representing the bar code is sent to the memory (22, 22' or 22'') in the read-out apparatus. On the basis of the bar code, the classifying information with respect to the stimulable phosphor sheet 1 on which image information readout is to be carried out is taken out from the memory (22, 22' or 22''). The signal representing the classifying information is sent to the CPU 101 in the image reproducing apparatus 100. The relationships between the trays 131, 132 and 133 and the classifying information are registered in advance in the CPU 101. The CPU 101 sends the signal S2 in accordance with the entered classifying information to the pulse motor 135, thereby to distribute and feed the recording sheet with the image information reproduced and developed thereon into the predetermined tray in accordance with the classifying information. Also, the relationships between the trays 131, 132 and 133 and the classifying information may be stored in advance in the memories 22, 22' and 22'', and the signal representing the number of the tray may be fed from the memories 22, 22' and 22'' to the CPU 101.

Instead of providing the controllers 10B to 19B with the function of reading out the bar code of the stimulable phosphor sheet and entering the classifying information, terminal sections 10C to 19C as indicated by the broken lines in FIG. 3 may be disposed at the image recording apparatuses 10 to 19 independently of the controllers 10B to 19B. Read-out of the bar code may be carried out by the terminal sections 10C to 19C. Also, the classifying information may be entered to the terminal sections 10C to 19C, and the bar codes and the classifying information may be sent from the terminal sections 10C to 19C to the memories 22, 22' and 22'' of the read-out apparatuses 20, 20' and 20''. Also, in this embodiment wherein the signal representing the bar code and the signal representing the classifying information are directly entered from the respective image recording apparatuses to the read-out apparatuses and the classifying information is taken out by comparison with the bar code which is read out at the read-out apparatus, the read-out apparatus for carrying out read-out of the image information is determined for each image recording apparatus. However, in the case where the stored information can be held in common among the memories 22, 22' and 22'' of the read-out apparatuses 20, 20' and 20'', read-out of the image information from the stimulable phosphor sheet 1 carrying the image information stored thereon at each image recording apparatus can be carried out at every read-out apparatus. In this case, even if a failure arises with the mechanism of the stimulating ray scanning system in one of the read-out apparatuses 20, 20' and 20'' or with the mechanism of the sheet conveyance system, or the like, read-out of the image information from the stimulable phosphor sheet can be carried out by use of the other read-out apparatuses insofar as the memories of the read-out apparatuses are operable.

A still further embodiment of the radiation image recording and reproducing system in accordance with the present invention, wherein distribution of the recording sheet is carried out in accordance with predetermined classifying conditions with respect to the image information reproduced and developed on the recording sheet, will hereinbelow be described with reference to FIG. 4. In this embodiment, the signals representing the bar codes and the signals representing the classifying information, which are output from the controllers 10B to 19B of the image recording apparatuses 10 to 19, are sent to a data controller 40 and stored therein. The stimulable phosphor sheet 1 on which the image recording is finished is sent to any one of the read-out apparatuses 20, 20' and 20'' for carrying out read-out from the stimulable phosphor sheet 1. In the course of the read-out, the bar code of the stimulable phosphor sheet 1 is read out by the bar code read-out means (29, 29' or 29'') in the read-out apparatus. In this embodiment, the stimulable phosphor sheet 1 carrying the image information stored thereon at each image recording apparatus may be sent to any of the read-out apparatuses 20, 20' and 20''.

The bar code read-out means 29, 29' and 29'' sends the signal representing the read-out bar code to the data controller 40. The classifying information corresponding to the bar code is taken out from the data controller 40 and sent to the memory (22, 22' or 22'') in the read-out apparatus which is now carrying out the read-out from the stimulable phosphor sheet 1. The signal representing the classifying information, which is entered into one of the memories 22, 22' and 22'', is sent to the CPU 101 at the time the read-out apparatus begins sending the image information to the image reproducing apparatus 100. On the basis of the relationships between the classifying information and the trays 131, 132 and 133, which are registered in advance, the CPU 101 generates the signal S2 for distributing and feeding the recording sheet into either one of the trays 131, 132 and 13 in accordance with the classifying information. With this embodiment wherein the data controller 40 is provided and the bar code of each stimulable phosphor sheet and the classifying information are stored in the data controller 40, the stimulable phosphor sheet on which the image recording is finished can be subjected to the image read-out at any of the read-out apparatuses 20, 20' and 20" regardless of the number of the image recording apparatus. The classifying information and the trays 131, 132 and 133 may be made to correspond to each other in the memories 22, 22' and 22" of the read-out apparatuses 20, 20' and 20", and the signal representing the number of the tray may be output from the memories 22, 22' and 22".

I claim:

1. A radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises connecting said image reproducing apparatus to a plurality of said read-out apparatuses for carrying out the reproduction and the development of the image information read out in said read-out apparatuses, providing said image reproducing apparatus with a plurality of trays, distributing and feeding said recording sheet, on which the development has been finished, into any one of said trays, and carrying out said distribution of said recording sheet in accordance with the read-out apparatus which was used for reading out said image information reproduced and developed on said recording sheet.

2. A system as defined in claim 1 wherein said image reproducing apparatus is provided with a plurality of storage means for storing the image information read out at the respective read-out apparatuses, and a control means for selectively connecting each of said storage means to a means disposed to modulate the recording light on the basis of the image information and for controlling movement of a feed-in means for feeding said recording sheet, on which the development has been finished, into any one of said trays.

3. A radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises constituting said image reproducing apparatus to carry out the reproduction and the development of the image information, which is recorded in a plurality of said image recording apparatuses, via said read-out apparatus, providing said image reproducing apparatus with a plurality of trays, distributing and feeding said recording sheet, on which the development has been finished, into any one of said trays, and carrying out said distribution of said recording sheet in accordance with the image recording apparatus which was used for recording said image information reproduced and developed on said recording sheet.

4. A system as defined in claim 3 wherein a plurality of said read-out apparatuses are provided, and said image reproducing apparatus is provided with a plurality of storage means for storing the image information read out at the respective read-out apparatuses, and a control means for selectively connecting each of said storage means to a means disposed to modulate the recording light on the basis of the image information and for controlling movement of a feed-in means for feeding said recording sheet, on which the development has been finished, into any one of said trays.

5. A system as defined in claim 3 wherein said read-out apparatus is provided with an input means for entering a signal representing said image recording apparatus which was used for recording said image information on said stimulable phosphor sheet, and a storage means for storing said signal representing said image recording apparatus and for feeding said signal representing said image recording apparatus to a control means provided in said image reproducing apparatus for controlling said distribution of said recording sheet.

6. A system as defined in claim 3 wherein said image recording apparatuses are provided with a means for reading out a bar code put on said stimulable phosphor sheet and sending a signal representing said bar code together with a signal representing the corresponding image recording apparatus to a storage means provided in said read-out apparatus, said read-out apparatus is provided with a bar code read-out means connected to said storage means, and said storage means feeds said signal representing said image recording apparatus corresponding to said bar code read out by said bar code read-out means to a control means provided in said image reproducing apparatus for controlling said distribution of said recording sheet.

7. A system as defined in claim 3 wherein said image recording apparatuses are provided with a means for reading out a bar code put on said stimulable phosphor sheet and sending a signal representing said bar code together with a signal representing the corresponding image recording apparatus to a data controller, said read-out apparatus is provided with a bar code read-out means and a storage means respectively connected to said data controller, and said storage means receives said signal representing said image recording apparatus corresponding to said bar code read out by said bar code read-out means from said data controller and feeds said signal representing said image recording apparatus to a control means provided in said image reproducing apparatus for controlling said distribution of said recording sheet.

8. A radiation image recording and reproducing system for exposing a stimulable phosphor sheet to a radiation carrying image information to have the image information stored on the stimulable phosphor sheet in an image recording apparatus, thereafter scanning the stimulable phosphor sheet by stimulating rays, which cause the stimulable phosphor sheet to emit light in proportion to the stored radiation energy, in a read-out apparatus, photoelectrically detecting the emitted light, and scanning a recording sheet by recording light modulated on the basis of the image information thus read out to reproduce the image information on the recording sheet and developing the reproduced image information in an image reproducing apparatus, wherein the improvement comprises providing said image reproducing apparatus with a plurality of trays, distributing and feeding said recording sheet, on which the development has been finished, into any one of said trays, and carrying out said distribution of said recording sheet in accordance with predetermined classifying conditions with respect to said image information reproduced and developed on said recording sheet.

9. A system as defined in claim 8 wherein said classifying conditions are operators for operating said image recording apparatus.

10. A system as defned in claim 8 wherein said classifying conditions are objects for which the image recording is carried out at said image recording apparatus.

11. A system as defined in claim 8 wherein said classifying conditions are persons who request the image recording at said image recording apparatus.

12. A system as defined in claim 8 wherein a plurality of said read-out apparatuses are provided, and said image reproducing apparatus is provided with a plurality of storage means for storing the image information read out at the respective read-out apparatuses, and a control means for selectively connecting each of said storage means to a means disposed to modulate the recording light on the basis of the image information and for controlling movement of a feed-in means for feeding said recording sheet, on which the development has been finished, into any one of said trays.

13. A system as defined in claim 8 wherein said read-out apparatus is provided with an input means for entering a signal representing said classifying conditions, and a storage means for storing said signal representing said classifying conditions and for feeding said signal representing said classifying conditions to a control means provided in said image reproducing apparatus for controlling said distribution of said recording sheet.

14. A system as defined in claim 8 wherein said image recording apparatus is provided with a means for reading out a bar code put on said stimulable phosphor sheet, entering said classifying conditions, and sending a signal representing said bar code and a signal representing said classifying conditions to a storage means provided in said read-out apparatus, said read-out apparatus is provided with a bar code read-out means connected to said storage means, and said storage means feeds said signal representing said classifying conditions corresponding to said bar code read out by said bar code read-out means to a control means provided in said image reproducing apparatus for controlling said distribution of said recording sheet.

15. A system as defined in claim 8 wherein said image recording apparatus is provided with a means for reading out a bar code put on said stimulable phosphor sheet, entering said classifying conditions, and sending a signal representing said bar code and a signal representing said classifying conditions to a data controller, said read-out apparatus is provided with a bar code read-out means and a storage means respectively connected to said data controller, and said storage means receives said signal representing said classifying conditions corresponding to said bar code read out by said bar code read-out means from said data controller and feeds said signal representing said classifying conditions to a control means provided in said image reproducing apparatus for controlling said distribution of said recording sheet.

\* \* \* \* \*